United States Patent
Bantas et al.

(10) Patent No.: US 9,032,355 B2
(45) Date of Patent: May 12, 2015

(54) SYSTEM AND METHOD FOR INTEGRATED TRANSFORMER SYNTHESIS AND OPTIMIZATION USING CONSTRAINED OPTIMIZATION PROBLEM

(71) Applicant: Helic S.A., Athens (GR)

(72) Inventors: Sotirios Bantas, Athens (GR); Konstantinos Karouzakis, Athens (GR); Stefanos Stefanou, Athens (GR); Apostolos Liapis, Athens (GR); Labros Kokkalas, Athens (GR)

(73) Assignee: Helic S.A., Athens (GR)

( * ) Notice: Subject to any disclaimer, the term of this patent is extended or adjusted under 35 U.S.C. 154(b) by 0 days.

(21) Appl. No.: 14/045,305

(22) Filed: Oct. 3, 2013

(65) Prior Publication Data
US 2015/0100934 A1 Apr. 9, 2015

(51) Int. Cl.
*G06F 17/50* (2006.01)

(52) U.S. Cl.
CPC ........ *G06F 17/5009* (2013.01); *G06F 17/5068* (2013.01)

(58) Field of Classification Search
CPC .............................. G06F 17/5068; H03H 7/40
USPC .................. 716/106, 110, 122, 123, 132, 136
See application file for complete search history.

(56) References Cited

U.S. PATENT DOCUMENTS

| | | | | |
|---|---|---|---|---|
| 5,838,723 A | * | 11/1998 | Mack et al. | 375/220 |
| 6,026,286 A | * | 2/2000 | Long | 455/327 |
| 6,816,012 B2 | * | 11/2004 | Aoki et al. | 330/276 |
| 6,956,944 B1 | * | 10/2005 | Koren | 379/406.01 |
| 7,020,452 B1 | * | 3/2006 | Kobayashi | 455/326 |
| 7,243,321 B2 | * | 7/2007 | Wang et al. | 716/112 |
| 7,425,869 B2 | * | 9/2008 | Aoki et al. | 330/276 |
| 7,496,871 B2 | * | 2/2009 | Suaya et al. | 716/136 |
| 7,539,965 B2 | * | 5/2009 | Bromberger et al. | 716/120 |
| 8,108,163 B2 | * | 1/2012 | Kashiwakura | 702/65 |
| 8,181,140 B2 | * | 5/2012 | Kireev et al. | 716/122 |
| 8,250,506 B2 | * | 8/2012 | Bantas et al. | 716/110 |

(Continued)

OTHER PUBLICATIONS

Chiang et al.; "Optimal capacitor placement, replacement and control in large-scale unbalanced distribution systems: modeling and a new formulation"; Power Systems, IEEE Transactions on; vol. 10 , Issue: 1; Publication Year: 1995 , pp. 356-362; Cited by: Papers (23).*

*Primary Examiner* — Helen Rossoshek
(74) *Attorney, Agent, or Firm* — Nixon Peabody LLP; Khaled Shami

(57) ABSTRACT

A method for designing a transformer in an integrated circuit includes receiving one or more desired characteristics of the transformer from user input and iteratively determining a design solution for the transformer through one or more simulations and modifications using a rule-set. The method combines the one or more desired characteristics with other preset characteristics of the transformer or the integrated circuit. A first model of the transformer is defined with typical load impedances and simulated having the combined characteristics to determine performance. Results of the simulation are processed to calculate performance with the load impedances specified by the user. The results are further processed to obtain a mathematical model that includes tuning capacitors. The first and subsequent models are modified by drawing on a rule-set of expert knowledge relating to general dependency of at least one design criterion, such as a physical, geometrical or performance characteristic, with another design criterion.

15 Claims, 13 Drawing Sheets

(56) References Cited

U.S. PATENT DOCUMENTS

| | | | |
|---|---|---|---|
| 8,667,452 B2* | 3/2014 | Verghese et al. | 716/136 |
| 8,769,447 B2* | 7/2014 | Bantas et al. | 716/100 |
| 2003/0182639 A1* | 9/2003 | Lehner et al. | 716/4 |
| 2009/0193370 A1* | 7/2009 | Bantas et al. | 716/4 |
| 2009/0235208 A1* | 9/2009 | Nakayama et al. | 716/1 |
| 2010/0023896 A1* | 1/2010 | Rastogi et al. | 716/1 |
| 2010/0037189 A1* | 2/2010 | Bickel | 716/4 |
| 2010/0088657 A1* | 4/2010 | Bantas et al. | 716/4 |
| 2010/0175035 A1* | 7/2010 | He et al. | 716/5 |
| 2010/0259110 A1* | 10/2010 | Kurs et al. | 307/104 |
| 2011/0025435 A1* | 2/2011 | Gorbachov | 333/245 |
| 2011/0113401 A1* | 5/2011 | Kireev et al. | 716/136 |
| 2012/0022713 A1* | 1/2012 | Deaver et al. | 700/298 |
| 2012/0112531 A1* | 5/2012 | Kesler et al. | 307/9.1 |
| 2012/0239117 A1* | 9/2012 | Kesler et al. | 607/61 |
| 2012/0242159 A1* | 9/2012 | Lou et al. | 307/104 |
| 2012/0248981 A1* | 10/2012 | Karalis et al. | 315/70 |
| 2013/0159956 A1* | 6/2013 | Verghese et al. | 716/122 |
| 2014/0181782 A1* | 6/2014 | Verghese et al. | 716/136 |

* cited by examiner

SYSTEM AND METHOD FOR INTEGRATED TRANSFORMER SYNTHESIS AND OPTIMIZATION USING CONSTRAINED OPTIMIZATION PROBLEM

FIELD OF THE INVENTION

The invention relates to the field of Electronic Design Automation (EDA) software for designing inductors, transformers and related circuits particularly for integrated circuits (ICs).

BACKGROUND

In electrical and electronic circuit engineering, a transformer is a versatile and ubiquitous component that accomplishes impedance level transformation between its primary and secondary windings through magnetic coupling, while providing direct current (DC) isolation between the primary and secondary windings. These properties are useful today in the field of IC design, and especially for radio frequency (RF) IC design, because inductive components such as spiral coils functioning as primary and secondary windings can be fabricated with good performance characteristics using known semiconductor fabrication techniques.

FIG. 1 illustrates an example geometry of a transformer 100 integrated on an IC. An integrated spiral transformer can be employed to transform impedance levels between different parts of an IC, convert signals from balanced (differential) to single-ended format, or interface chip circuitry to off-chip devices, circuits or fixtures. For instance, an integrated transformer can be employed to interface low impedance (e.g. few ohms) output of an integrated complementary metal oxide silicon (CMOS) power amplifier (PA) through the output pad of the IC and to an external 50-ohm system. Some of these applications are described in detail, for example, in the book "RF Microelectronics" by Behzad Razavi.

What is needed then are methods and systems for improving and/or simplifying the design of components such as integrated spiral transformers for use in ICs fabricated using modern semiconductor fabrication techniques that take into account the different functionality of the designed-for transformers and the interaction of such transformers with other components of an IC.

SUMMARY

Embodiments of the invention also provide a method of optimizing the design of a transformer or circuit for an integrated circuit. In an embodiment, a method for designing a transformer in an integrated circuit comprises receiving one or more desired characteristics of the transformer from user input and iteratively determining a design solution for the transformer through one or more simulations and modifications using a rule-set. The method combines the one or more desired characteristics with other preset characteristics of the transformer or the integrated circuit. A first model of the transformer is defined with typical load impedances and simulated having the combined characteristics to determine performance. Results of the simulation are processed to calculate performance with the load impedances specified by the user. The results are further processed to obtain a mathematical model that includes tuning capacitors. The first and subsequent models are modified by drawing on a rule-set of expert knowledge relating to general dependency of at least one design criterion, such as a physical, geometrical or performance characteristic, with another design criterion.

In an embodiment, the method further comprises receiving one or more optimization targets from user input. A constrained optimization problem is solved to determine optimal values of the tuning capacitors based on the one or more desired characteristics and the one or more optimization targets. In an embodiment, the one or more optimization targets include lowest possible insertion loss.

In an embodiment, the method is usable to design a transformer including a plurality of taps connecting the primary coil to either a fixed potential, a signal, or a load. In an embodiment, the transformer includes a plurality of taps connecting the secondary coil to either a fixed potential, a signal, or a load.

In an embodiment, an apparatus for designing a transformer in an integrated circuit, the apparatus comprises a processor and a user interface adapted to allow a user to input one or more desired characteristics of the transformer. The one or more desired characteristics can include load impedances at primary and secondary coils of the transformer, and the processor is configured to determine sufficient optimal characteristics of the transformer to define the transformer for fabrication in the integrated circuit by executing embodiment of methods for designing a transformer in an integrated circuit comprises receiving one or more desired characteristics of the transformer from user input and iteratively determining a design solution for the transformer through one or more simulations and modifications using a rule-set.

BRIEF DESCRIPTION OF THE DRAWINGS

Embodiments of the invention will now be described, by way of example only, with reference to the accompanying drawings in which.

DETAILED DESCRIPTION

As disclosed in U.S. application Ser. No. 12/575,410 entitled "EXPERT SYSTEM-BASED INTEGRATED INDUCTOR SYNTHESIS AND OPTIMIZATION" by Bantas et al., incorporated herein by reference, the physical design of an integrated electrical component such as a spiral inductor can be effectively determined using a computer implemented method. The disclosed method iteratively uses electrical circuit simulation to determine the performance of a candidate physical component and draws on a rule-set of expert knowledge to enable modification of its physical properties, until a set of user-provided objectives and constraints are met. The model of a candidate physical design is preferably provided by an efficient electromagnetics (EM) model extraction engine. The disclosed method brings several advantages such as rapid execution and a high degree of computer-assisted automation; it has been incorporated in the VeloceRF™ EDA product offered by Helic, Inc. and is being used by several semiconductor design companies in production.

Having efficiently resolved the problem of designing integrated components such as spiral inductors, in the invention disclosed herein we concentrate on the related problem of designing integrated transformers.

Referring to FIGS. 2A-2E, several transformer configurations can be defined, depending on the signal conditions at the primary and secondary coils, and the existence of a center tap on either coil or the absence thereof. The configurations are as follows:

A. Differential to differential.
B. Differential with center tap, to differential.
C. Differential with center tap, to differential with center tap.
D. Differential to single-ended, sometimes referred-to as a 'balun'.
E. Differential with center tap, to single-ended.

The problem of optimally designing an integrated transformer presents some difficulties, which are known to those skilled in the art, such as:

On substrates such as silicon, the transformation ratio of, for instance, a "1:1" spiral transformer is far from unity. Electromagnetic modeling of transformer layout and simulation of this model with the actual loads presented to the transformer, are needed to DETermine performance. These steps are typically time-consuming and several iterations may be needed to achieve an optimal design.

Figure 1:
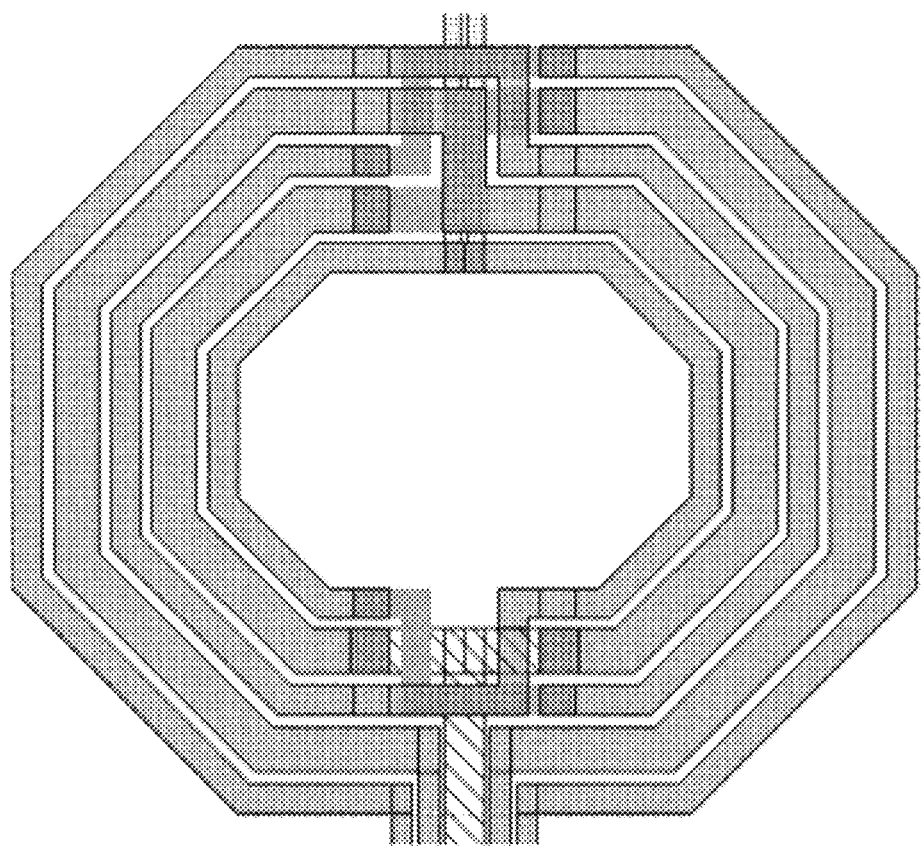
FIG. 1 illustrates a layout of an integrated transformer.
Figure 2:
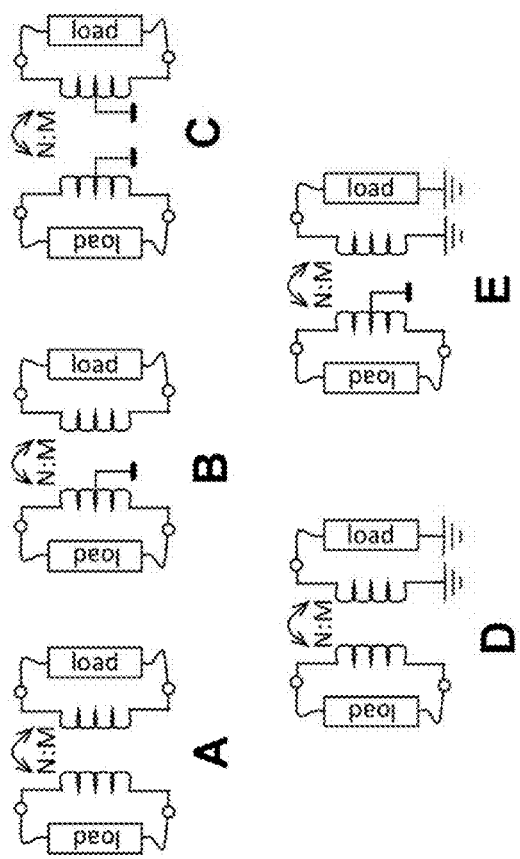
FIGS. 2A-2E illustrates various transformer configurations.
Figure 3:
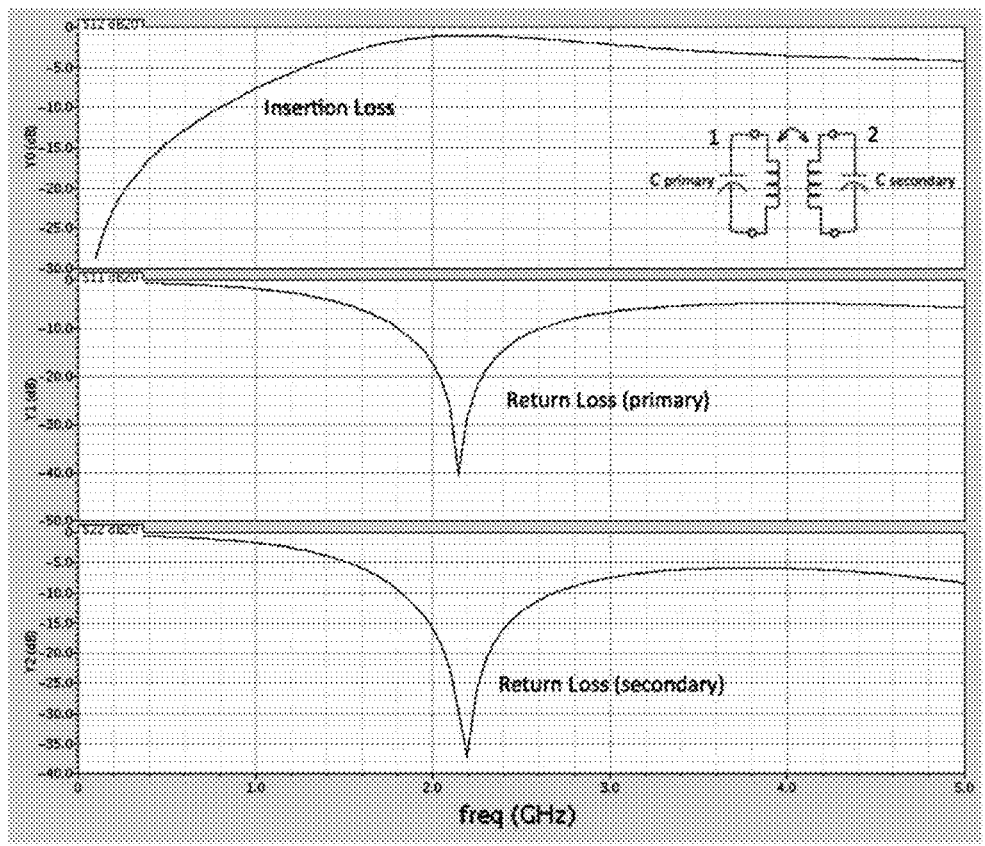
FIG. 3 illustrates electrical performance of a tuned transformer.

Besides the transformer (coil) geometry, for practical design capacitors may need to be designed coupled to the primary and/or secondary coils, for achieving a tuned LC circuit along with the inductance of the coils, which helps to minimize insertion loss, an unwanted side-effect. The performance of a tuned transformer, in terms of S-parameter responses, is illustrated in FIG. 3. The size of these capacitors should be designed in conjunction with the transformer itself, thereby increasing the number of potential design iterations.

The actual load specifications on at least one of the primary or secondary coils may not be known in advance, as these vary greatly depending on the sizing of the transistors and other components of the integrated circuitry that connects to the transformer. Ideally, the transformer block should be co-designed in iteration with the active circuit, e.g. the power amplifier (PA), which may not be practical due to time constraints.

The method and apparatus disclosed in U.S. application Ser. No. 12/575,410 helps to overcome some of the limitations described above. However, these need to be adapted and extended for tackling the problem of integrated transformers. The additional steps necessary are disclosed herein.

As disclosed in U.S. application Ser. No. 12/575,410, an expert system-based inductor synthesis system can comprise the following modules:

a Model Extraction Engine, which creates a model for an under-test candidate spiral geometry;
a Simulator, which simulates the model and measures the parameters needed by the expert system;
a rule set, which encapsulates expert knowledge for processing the information received from simulations and inferring the next candidate geometry that should be tested;
components of a software-based expert system, such as an Inference Engine; and
preferably, a user interface for communicating with the user.

Specific functions need to be introduced at the Model Extraction and Simulation steps to enable optimal transformer design according to this invention.

We first define a set of formulae that are used in the invention:

Scattering Parameters (S-Parameters)

Let T be a given transformer instance. By performing S-parameter analysis for a set of M frequencies:

$$F = \{f(1), \ldots, f(M)\}$$

we obtain a set S of S-parameter matrices:

$$s(i) = \begin{vmatrix} s_{11}(i) & s_{12}(i) \\ s_{21}(i) & s_{22}(i) \end{vmatrix}$$

for each i in $\{1, \ldots, M\}$.

Impedance Matrix

For any given S-parameter matrix S(i), we can obtain the corresponding impedance matrix, $$z(i) = \begin{vmatrix} z_{11}(i) & z_{12}(i) \\ z_{21}(i) & z_{22}(i) \end{vmatrix}$$

from the known formulae (as taught in "S-Parameter Techniques", Application Note 95-1, by Agilent Technologies, incorporated herein by reference):

$$Z11 = Z0 \cdot ((1+S11) \cdot (1-S22) + S12 \cdot S21)/det(I-S)$$

$$Z12 = Z0 \cdot 2 \cdot S12/det(I-S)$$

$$Z21 = Z0 \cdot 2 \cdot S21/det(I-S)$$

$$Z22 = Z0 \cdot ((1-S11) \cdot (1+S22) + S12 \cdot S21)/det(I-S)$$

where Z0 the characteristic impedance (e.g. 50 Ohm).

Inductance

If z(i) represents the impedance matrix of a transformer, the primary and secondary inductances can be calculated by:

$$L1(i) = Im(Z11(i))/(2 \cdot \pi \cdot f(i))$$

$$L2(i) = Im(Z22(i))/(2 \cdot \pi \cdot f(i))$$

$$k(i) = Im(Z12(i))/\text{sqrt}(Im(Z11(i)) \cdot Im(Z22(i)))$$

where index 1 is assumed to correspond to the primary coil port of the transformer, and index 2 to the secondary coil port.

The resonance frequency Fres of the transformer, such that, $$f(k) \leq Fres < f(k+1)$$

$$L1(k) > 0 \text{ and } L2(k) > 0$$

$$L1(k+1) < 0 \text{ or } L2(k+1) < 0$$

can be calculated by linear interpolation, after finding the first value of i for which $L1(i)L1(i+1)<0$, or $L2(i)L2(i+1)<0$.

Quality Factor

If $z(i)$ represents the impedance matrix of a transformer, the primary and secondary quality factor can be calculated by:

$$Q1(i)=Im(Z11(i))/Re(Z11(i))$$

$$Q2(i)=Im(Z22(i))/Re(Z22(i))$$

The maximum quality factor Q1max, Q2max and the corresponding frequencies F1max, F2max can also be calculated by evaluating the discrete functions $Q1(i)$, $Q2(i)$ for each sampled frequency $f(1)<=f(i)<Fres$.

Bandwidth

We define the bandwidth of a transformer in terms of its insertion loss S12. Let S12_ref be the insertion loss at a given frequency f_ref. Given a tolerance value S12_tol (e.g. −1 dB or −3 dB relative to S12_ref) the bandwidth can then be described as a frequency interval:

$$BW=[f\_ref-f\_BW1, f\_ref+f\_BW2]$$

such that:

$$S12(f\_ref-f\_BW1)=S12\_ref-S12\_tol$$

$$S12(f\_ref+f\_BW2)=S12\_ref-S12\_tol$$

and:

$$S12(f)>S12ref-S12\_tol$$

for all f in BW.

The bandwidth of a transformer at given frequency $f(i)$ can be numerically approximated as follows:

Define S12_ref=S12(i) and f_ref=f(i).

Locate the first $k>i$ such that $S12(k)<=S12\_ref-S12\_tol$ and obtain f_BW2 by linear interpolation between (S12(k−1), f(k−1)) and (S12(k), f(k)).

Locate the last $k<i$ such that $S12(k)<=S12\_ref-S12\_tol$ and obtain f_BW1 by linear interpolation between (S12(k), f(k)) and (S12(k+1), f(k+1)).

Arbitrary Loads

The S-parameter matrix $s(i)$ is measured with both ports connected to reference loads of Z0=50 ohm. If the circuit is connected to arbitrary complex loads Zp, Zs, its electrical behaviour is described by a transformation of $s(i)$ as described in the book "Microwave Amplifiers and Oscillators" by Christian Gentili, incorporated herein by reference:

$$s'(i) = \begin{vmatrix} s'_{11}(i) & s'_{12}(i) \\ s'_{21}(i) & s'_{22}(i) \end{vmatrix}$$

where:

$$S11'=((1-Gs.S22)\cdot(S11-Conj(Gp))+S12\cdot S21\cdot Gs\cdot A11)/DS$$

$$S12'=(S12\cdot(1.0-|Gp|^2)\cdot A21)/DS$$

$$S21'=(S21\cdot(1.0-|Gs|^2)\cdot A12)/DS$$

$$S22'=((1-Gp\cdot S11)\cdot(S22-Conj(Gs))+S12\cdot S21\cdot Gp\cdot A22)/DS$$

and where the reflection coefficients are defined as:

$$Gp=(Zp-Z0)/(Zp+Z0)$$

$$Gs=(Zs-Z0)/(Zs+Z0)$$

and the remaining matrices are defined as:

$$A = \begin{vmatrix} A_{11} & A_{12} \\ A_{21} & A_{22} \end{vmatrix} = \begin{vmatrix} Conj(Ap)/Ap & Conj(Ap)/As \\ Conj(As)/Ap & Conj(As)/As \end{vmatrix}$$

$$Ap=((1-Conj(Gp))\cdot Sqrt(1.0-|Gp|^2)))/|1-Gp|$$

$$As=((1-Conj(Gs))\cdot Sqrt(1.0-|Gs|^2)))/|1-Gs|$$

$$DS=(1-Gp\cdot S11)\cdot(1-Gs\cdot S22)-(S12\cdot S21\cdot Gp\cdot Gs)$$

Cascaded Circuits

For any given S-parameter matrix s, we can obtain the corresponding scattering transfer parameter (T-parameter) matrix (as taught in "S-Parameter Design", Application Note 154, by Agilent Technologies):

$$T = \begin{vmatrix} T_{11} & T_{12} \\ T_{21} & T_{22} \end{vmatrix}$$

using the formulae:

$$T11=-det(S)/S12$$

$$T12=S11/S12$$

$$T21=-S22/S12$$

$$T22=1/S12$$

Consider a pair of 2-port circuits described by their S-parameter matrices S1 and S2. By definition, the T-parameter matrix T of the cascaded circuit is given by:

$$T=T1\cdot T2$$

where T1, T2 the T-parameter matrices corresponding to S1 and S2 respectively.

The S-parameter matrix of the cascaded circuit can then be calculated by the reverse transformation:

$$S11=T12/T22$$

$$S12=det(T)/T22$$

$$S21=1/T22$$

$$S22=-T21/T22$$

Tuning Capacitors

Consider a 2-port network consisting of a shunt capacitor C. The S-parameter matrix of this circuit would be:

$$s_C(C, f) = \begin{vmatrix} -y(C,f) & 2 \\ 2 & -y(C,f) \end{vmatrix} \cdot \frac{1}{y(C,f)+2}$$

where $y(C,f)$ is the normalized admittance of C and f the frequency, whereby:

$$y(C,f)=j\cdot 2\cdot \pi\cdot f\cdot C$$

The corresponding T-parameter matrix is given by:

$$T_C(C, f) = \begin{vmatrix} 2-y(C,f) & -y(C,f) \\ y(C,f) & 2+y(C,f) \end{vmatrix} \cdot \frac{1}{2}$$

Now, consider a transformer described by a set of S-parameter matrices S (i) and a pair of tuning capacitors c1, connected in parallel to port 1 (primary), and c2, connected in parallel to port 2 (secondary).

Then, the T-parameter matrix of the whole (tuned) transformer circuit, for any sampled frequency f(i), is given by:

$$Ttun(c1,c2,i)=Tc(c1,f(i))\cdot T(i)\cdot Tc(c2,f(i))$$

The S-parameter matrix stun (c1, c2, i) of the tuned transformer can easily be obtained by a simple T-to-S transformation.

Transformer Inductance and Quality Factor Calculation

Given a transformer described by:
a set of S-parameter matrices S,
sampled at a set of frequencies F={f(1), ..., f(M)}, and
an operating frequency f(i), i in {1, ..., m}, Using the formulae provided above in reference to inductance, we may easily calculate and return the following quantities:
the primary/secondary inductances L1(i), L2(i), k(i),
the primary/secondary quality factors Q1(i), Q2(i),
the maximum quality factors (Q1max, F1max), (Q2max, F2max), and
the resonance frequency Fres.

Transformer Optimization to Arbitrary Loads

We next disclose a method according to the invention, for optimizing an instance of a transformer design coupled to arbitrary loads.

Given a transformer described by:
a set of S-parameter matrices S,
sampled at a set of frequencies F={f(1), ..., f(M)},
and given an operating frequency f(i), with i in {1, ..., M},
a pair of primary/secondary loads Zp, Zs, which may be defined either as fixed complex numbers or as RL/RC series/parallel circuits, we calculate a pair of tuning capacitors c1, c2 such that the insertion loss S12'(i) of the tuned circuit is maximal, subject to the following constraints:
the capacitor values are restricted by $$c1 \text{ in } [c1min, c1max], \text{ and}$$

$$c2 \text{ in } [c2min, c2max].$$

the return losses are restricted by $$S11' <= RL\_max, \text{ and}$$

$$S22' <= RL\_max.$$

the bandwidth [f(i)−f_BW1, f(i)+f_BW2] of S12' is restricted by $$f\_BW1 >= BW\_min, \text{ and}$$

$$f\_BW2 <= BW\_max.$$

The above equations define a bounded constrained optimization problem, which is solvable by known methods, such as Powell's COBYLA (Constrained Optimization BY Linear Approximations) algorithm for derivative-free optimization with nonlinear inequality constraints, which is described in the paper by M. J. D. Powell, "A direct search optimization method that models the objective and constraint functions by linear interpolation", Advances in Optimization and Numerical Analysis, 1994, p. 51-67, incorporated herein by reference.

The COBYLA method constructs linear approximations to the objective and the constraint functions by interpolating between the vertices of a n-dimensional simplex, where n the number of variables (in this case, the variables being c1 and c2, we have n=2).

We then define, according to the invention, a callback function callback (c1, c2) which performs the following operations:
obtains reference S-parameter matrix S;
for each frequency f(i) in F:
performs T-parameter cascade transformation (as described above in reference to cascaded circuits) to calculate the S-parameter matrix S_cap of the tuned transformer circuit with reference loads, according to a desired transformer configuration,
performs arbitrary load conversion (as described in reference to arbitrary loads) on S_cap to obtain the S-parameter matrix S_tuned of the tuned transformer circuit with loads Zp, Zs,
performs bandwidth calculation (as described in reference to bandwidth) on S_tuned to obtain the bandwidth f_BW1, f_BW2, and
calculates the objective function |S12_tuned (i)|, i.e. the insertion loss at the operating frequency f(i).
Calculates the constraints:
err_c1, proportional to
c1−c1min if c1min>c1, or
c1max−c1 otherwise.
err_c2, proportional to
c2−c2 min if c2 min>c2, or
c2max−c2 otherwise.
err_r11, proportional to RL_max−S11.
err_r12, proportional to RL_max−S22.
err_bw1, proportional to f_BW1−BW_min.
err_bw2, proportional to BW_max−f_BW2.

The COBYLA optimization engine calls callback (c1, c2) repeatedly for various values of c1, c2, attempting to
minimize the objective value, and
make all constraints nonnegative.

The invention can be adapted by those skilled in the art, to incorporate alternative constrained optimization methods, equivalent to COBYLA and/or alternative constraints to meet the desired objectives.

Figure 4:
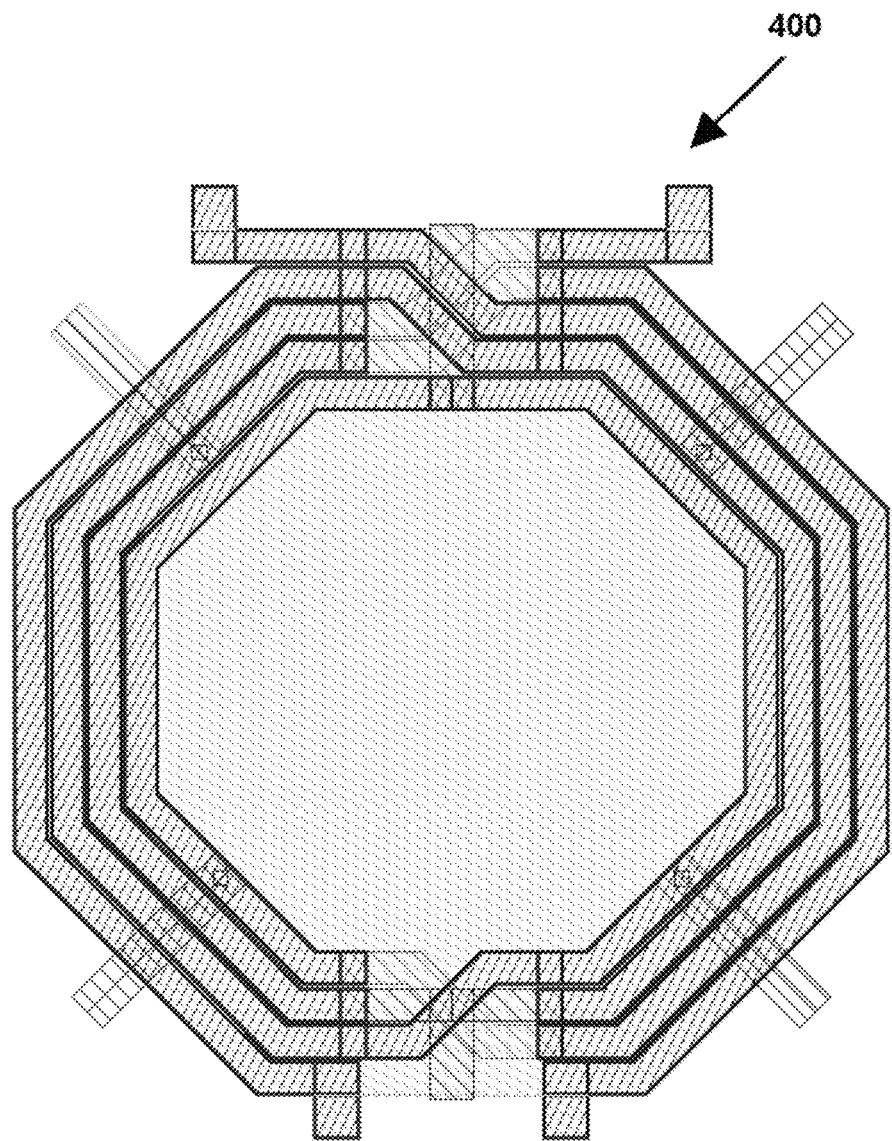
FIG. 4 illustrates a layout of a multi-tap transformer.

Although the invention is presented here with embodiments involving transformers with primary and secondary coils, and with optional taps at either primary and/or secondary coils connected at fixed potential, those skilled in the art will realize that it can be extended and applied to the synthesis and optimization of 'multi-tap' transformers 400 as well (illustrated in FIG. 4), whereby each of a plurality of taps may be connected to a signal at a given impedance level.

The above constrained optimization problem may be combined with a simulation-based expert system method to accomplish physical design synthesis and optimization of transformers, including the design of tuning capacitors, in an advantageous manner. Those skilled in the art will appreciate upon reflecting on the teaching included herein that an EDA method thus implemented will automate the process of implementing integrated transformers and will moreover provide a valuable tool to circuit designers for optimizing their circuits employing transformers.

Figure 5:
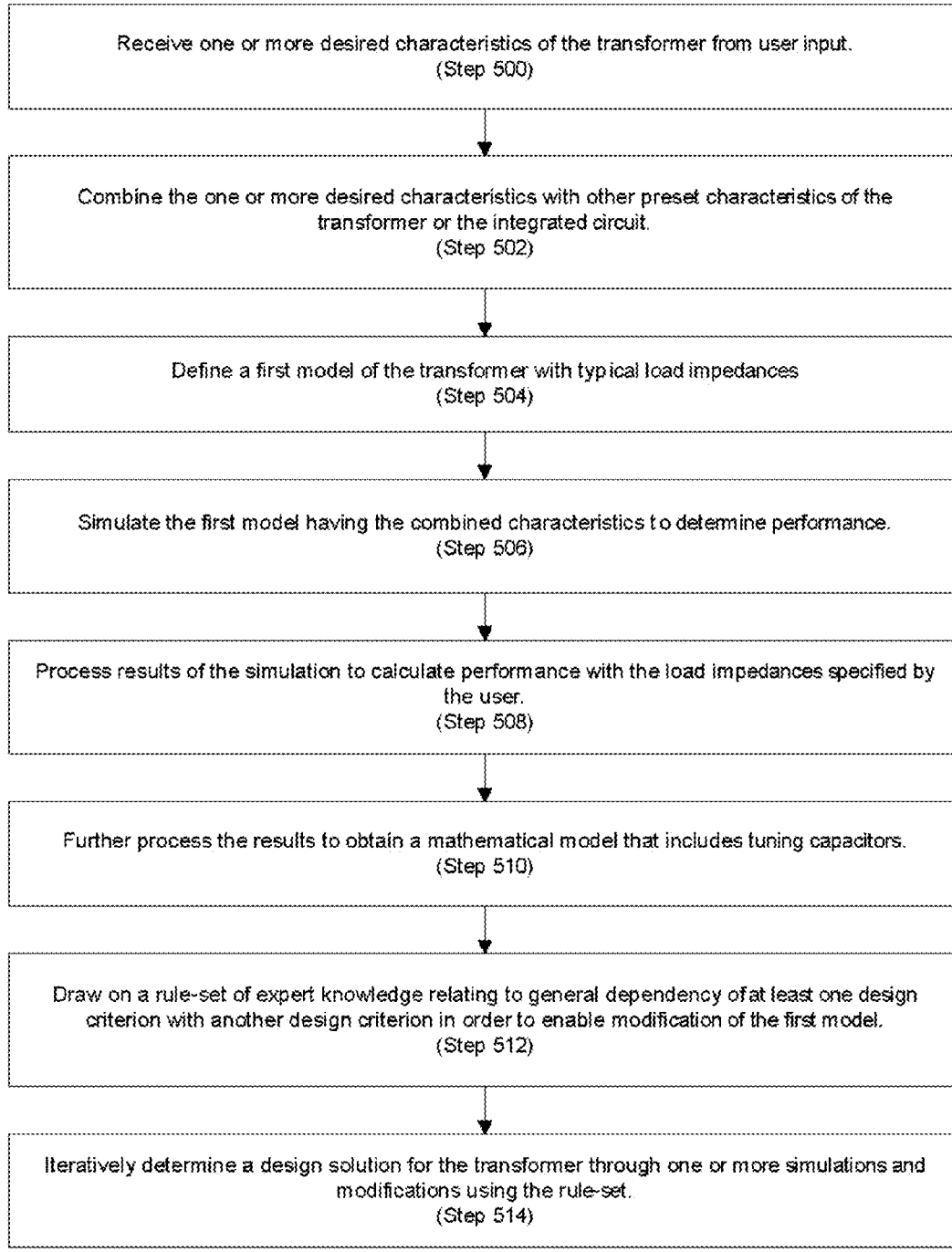
FIG. 5 is a flowchart of an embodiment of a method for designing a transformer in an integrated circuit in accordance with the present invention.

Referring to FIG. 5, a flowchart of an embodiment of a method for designing a transformer in an integrated circuit in accordance with the present invention is shown. The method comprises iteratively determining a design solution for the transform through one or more simulations and modification using a rule set. The method further comprises receiving one or more desired characteristics of the transformer from user input (Step 500). The one or more desired characteristics are combined with other preset characteristics of the transformer or the integrated circuit (Step 502). A first model of the transformer is defined with typical load impedances (Step 504). The first model is simulated having the combined characteristics to determine performance of the first model (Step 506). Results of the simulation are then processed to calculate performance with the load impedances specified by the user (Step 508). The results are further processed to obtain a mathematical model that includes tuning capacitors (Step 510). The design solution is then iteratively determined drawing on a rule set of expert knowledge relating to generate dependency of the at least one design criterion, such as a physical, geometrical or performance characteristic, with another design criterion in order to enable modification of the first model and subsequent iterative models (Steps 512 and 514).

Figure 6A:
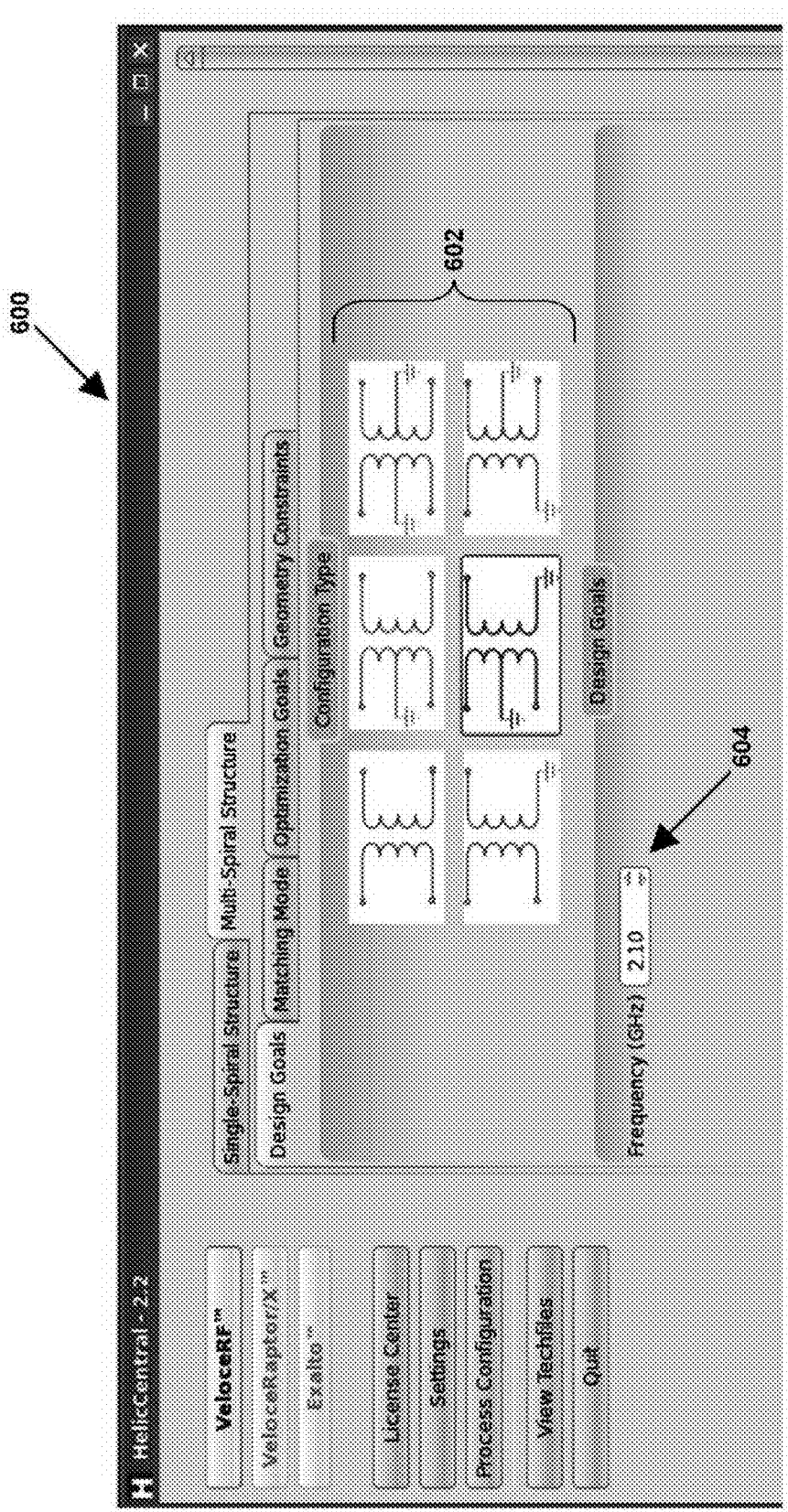
FIGS. 6A and 6B illustrate an embodiment of a user interface for selecting a transformer configuration and center frequency in accordance with the present invention.
Figure 6B:
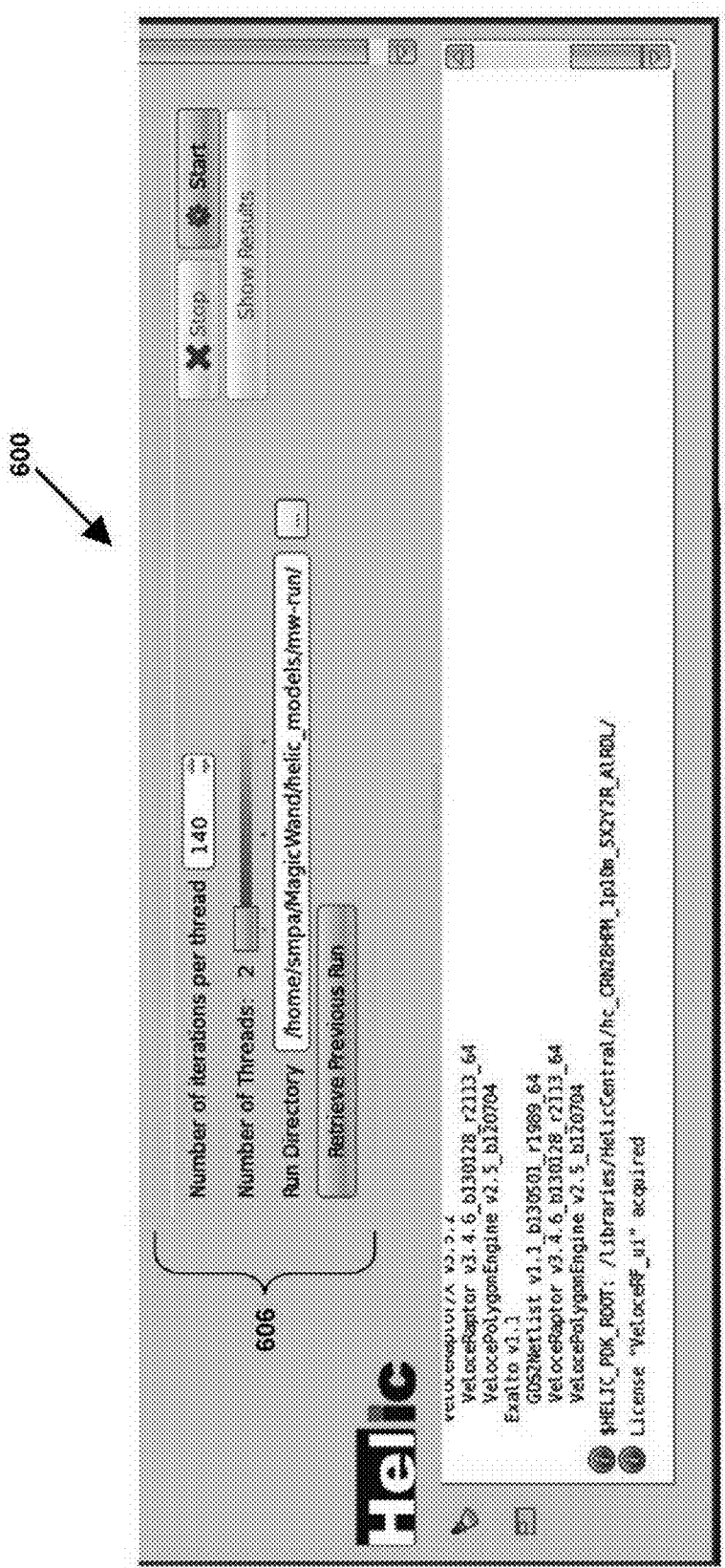
Figure 7A:
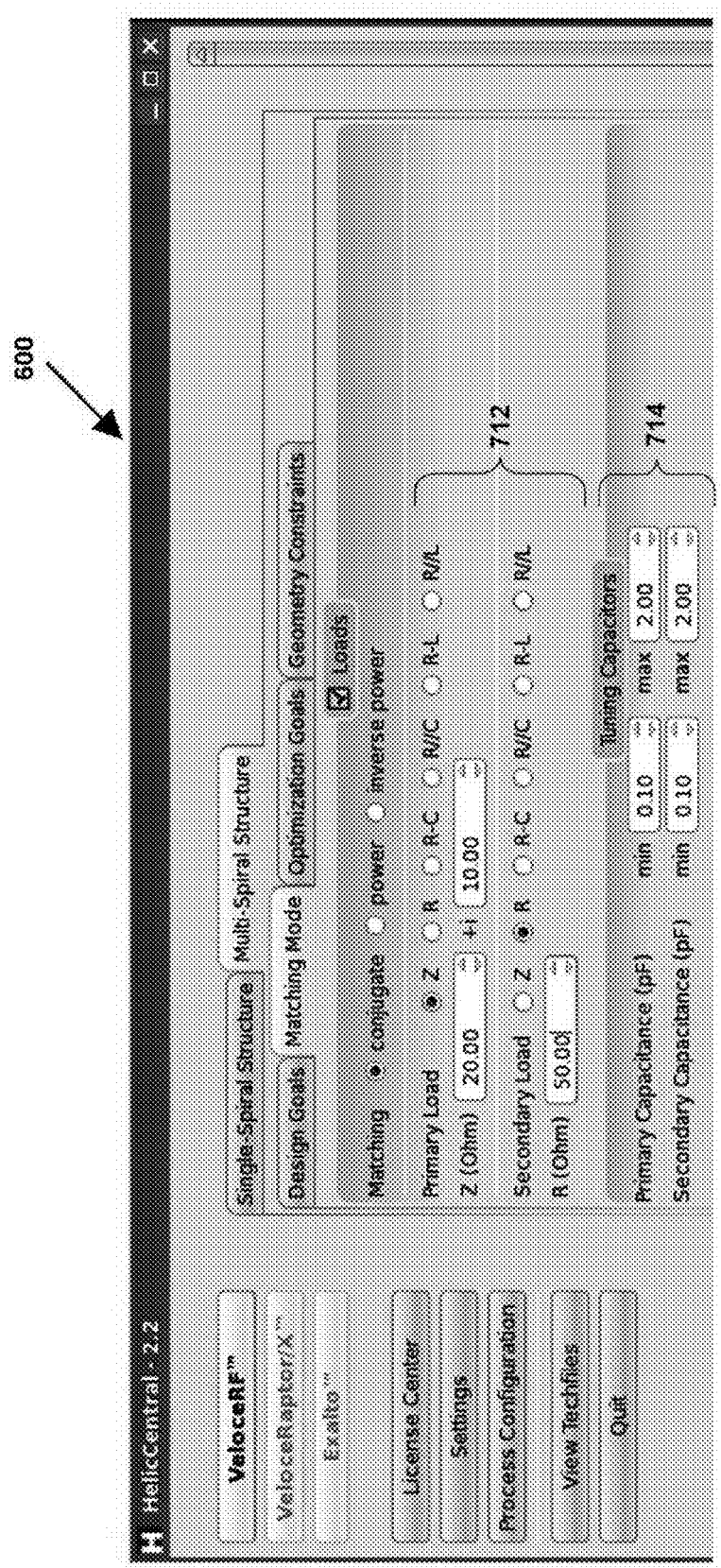
FIGS. 7A and 7B illustrate an embodiment of a form for defining impedance matching properties, load specifications, and tuning capacitor ranges when designing an IC including a transformer in accordance with the present invention.
Figure 7B:
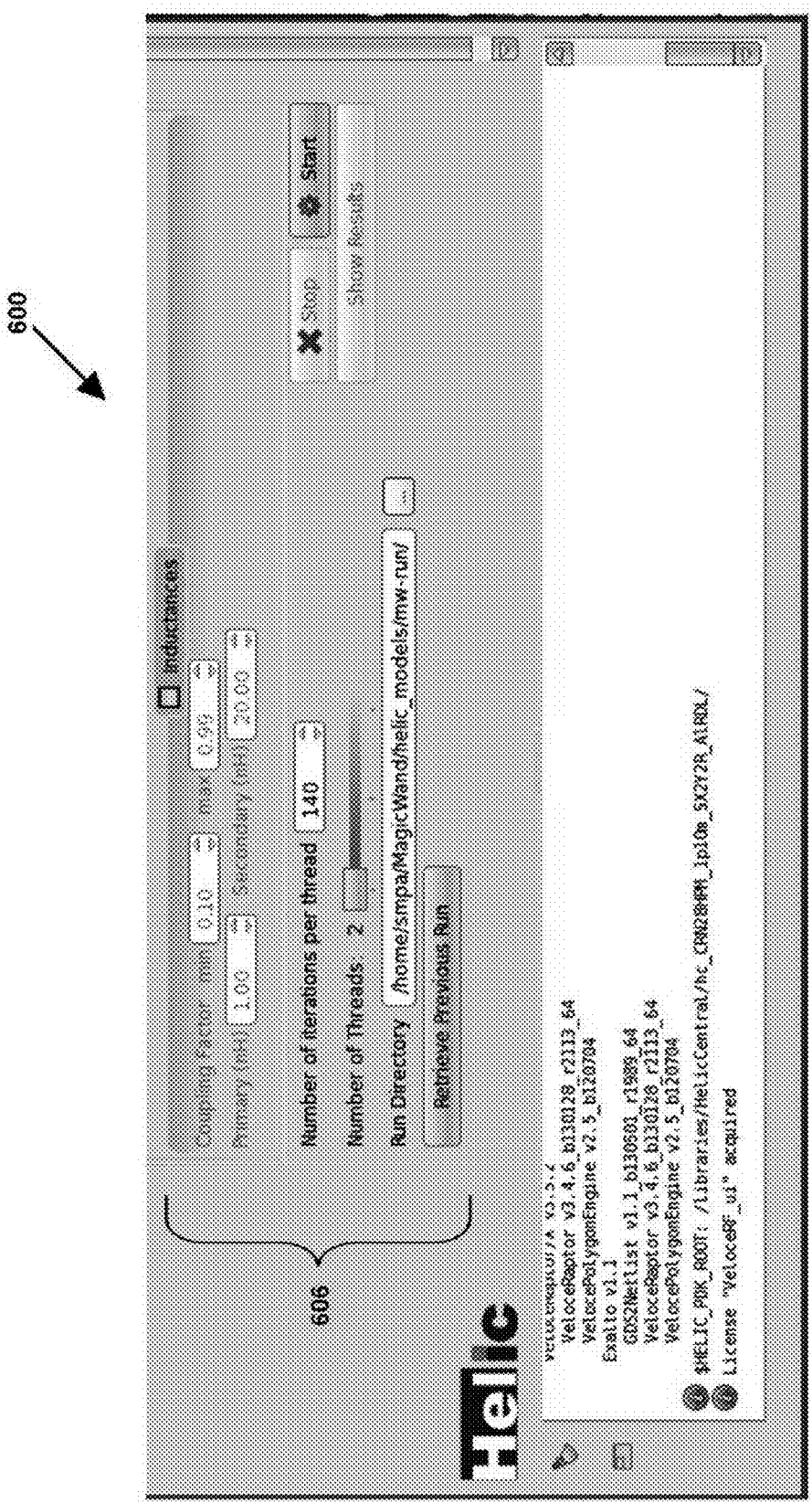
Figure 8A:
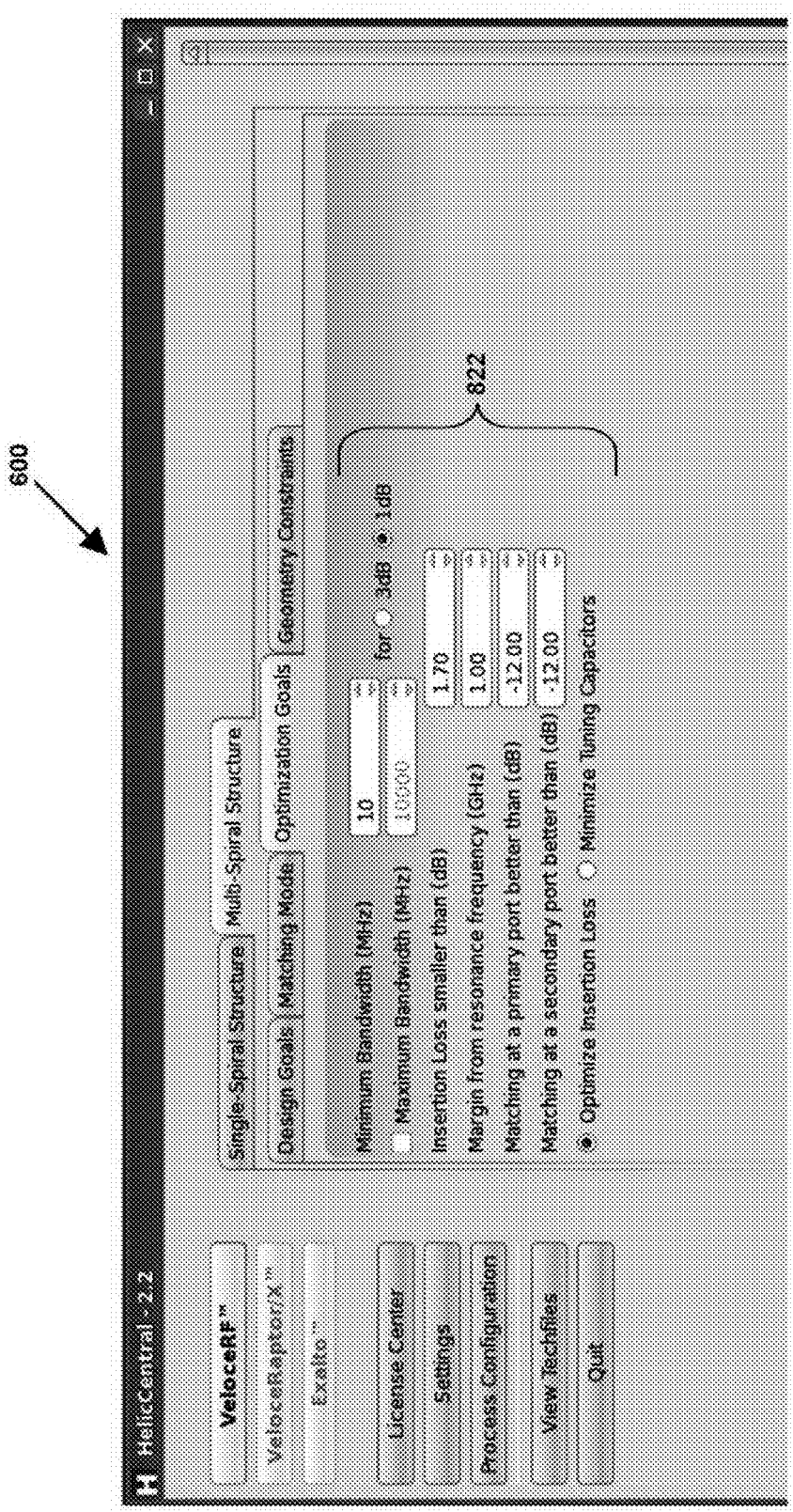
FIGS. 8A and 8B illustrate is an embodiment of a form for entering bandwidth, insertion and return loss constraints when designing an IC including a transformer in accordance with the present invention.
Figure 8B:
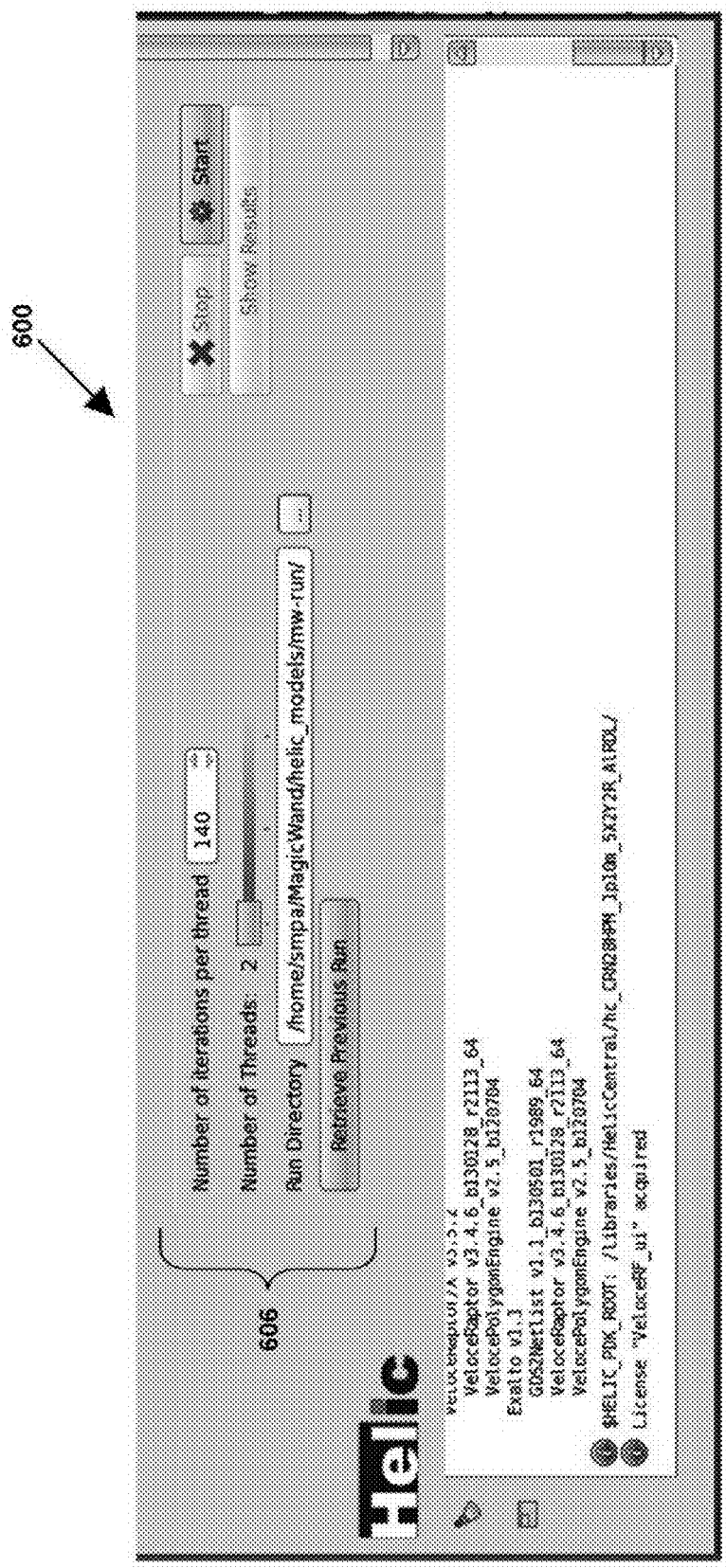
Figure 9A:
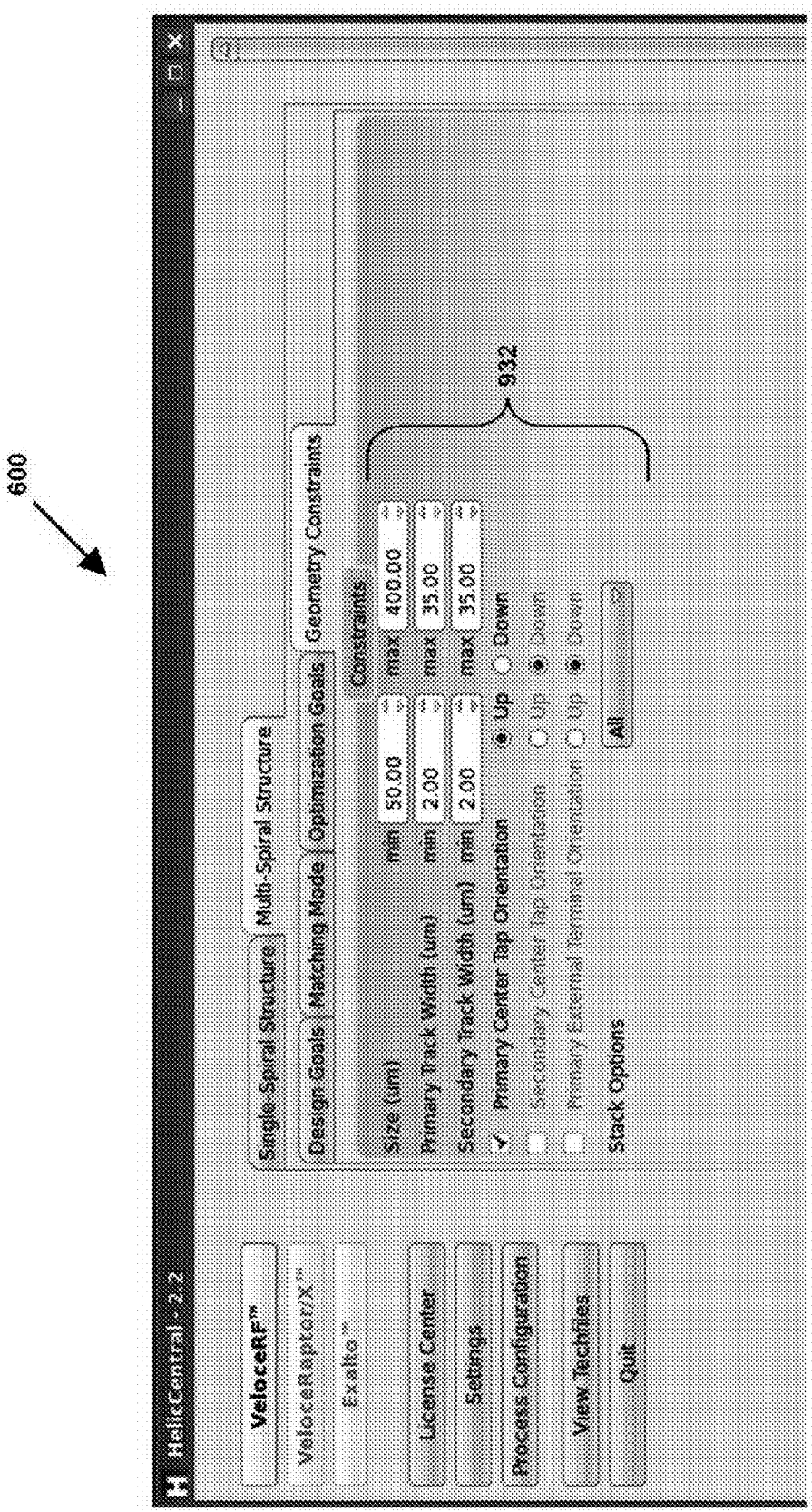
FIGS. 9A and 9B illustrate is an embodiment of contains a form for defining layout geometry options and size constraints when designing an IC including a transformer in accordance with the present invention.
Figure 9B:
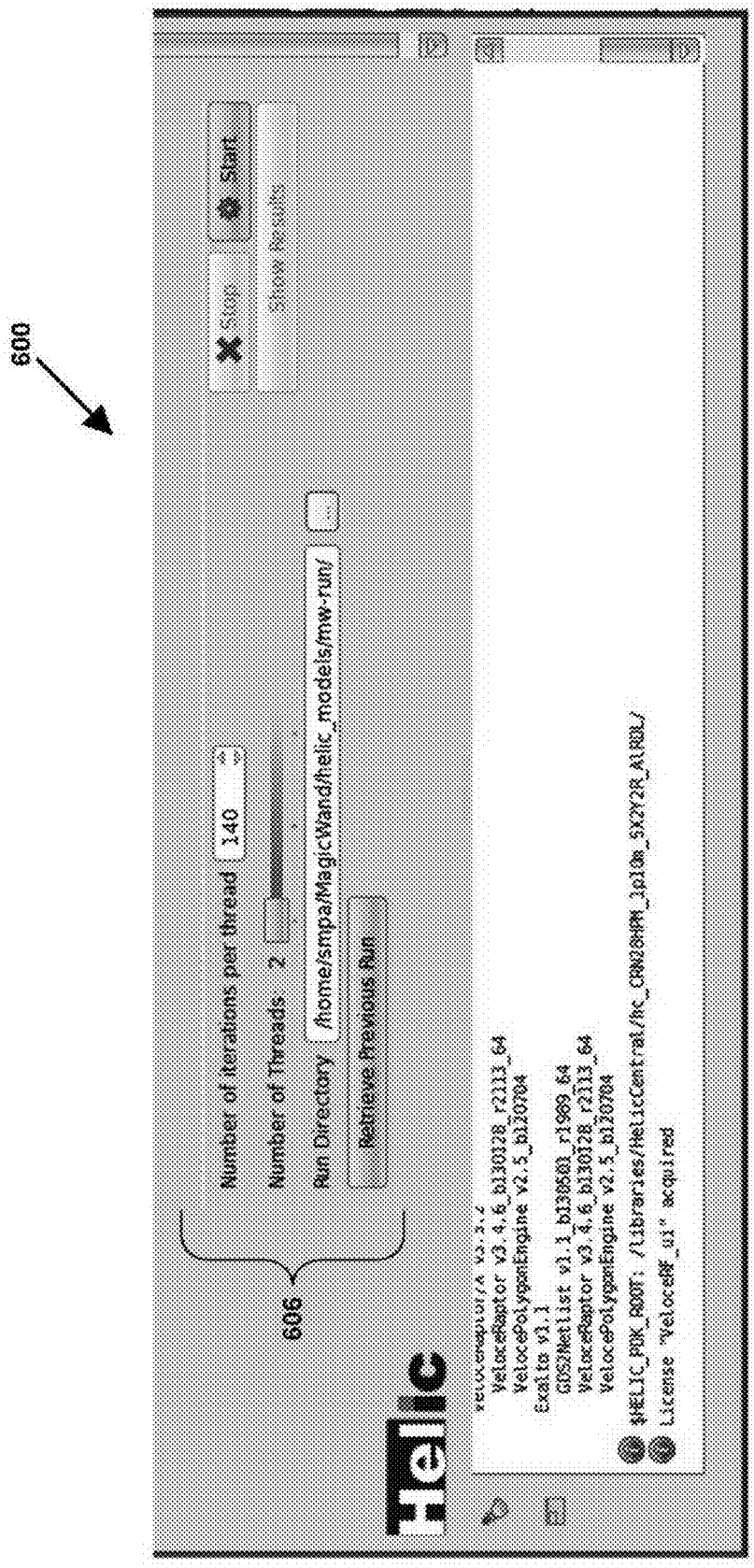

To further enhance the usefulness of the invention, we propose a user interface whereby circuit designers may enter their desired parameters and accomplish automated transformer synthesis and optimization. Such parameters may include electrical specifications for the transformation, geometrical constraints for the transformer's physical layout, and other parameters, objectives and constraints that are relevant to the circuit being designed. FIGS. 6A and 6B illustrate a form 600 with a design goals tab selected for defining the transformer configuration, defined by selecting the configuration in the configuration type frame 602, and center frequency, defined in the frequency selection frame 604. FIGS. 7A and 7B illustrate the form 600 with a matching mode tab selected for defining the impedance matching properties and load specifications, defined in a load settings frame 712, and tuning capacitor ranges, defined in the capacitance selection frame 714. FIGS. 8A and 8B illustrate the form 600 with an optimization goals tab selected for defining bandwidth, insertion and return loss constraints, each defined in the optimization goals frame 822. FIGS. 9A and 9B illustrate the form 600 with a geometry constraints menu selected for defining layout geometry options and size constraints, defined in the geometry constraints menu 932. The form 600 further includes an iteration selection frame 606 for defining a number of iteration a simulation should perform. The method can further include receiving one or more optimization targets and solving a constrained optimization problem to determine optimal values of the tuning capacitors based on the one or more desired characteristics and the one or more optimization targets.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The previous description of the preferred embodiments is provided to enable any person skilled in the art to make or use the embodiments of the present invention. While the invention has been particularly shown and described with reference to preferred embodiments thereof, it will be understood by those skilled in the art that various changes in form and details may be made therein without departing from the spirit and scope of the invention.

What is claimed is:

1. An apparatus for designing a transformer in an integrated circuit, the apparatus comprising:
a processor; and
a user interface adapted to allow a user to input one or more desired characteristics of the transformer;
wherein the one or more desired characteristics include load impedances at primary and secondary coils of the transformer;
wherein the processor is configured to determine sufficient optimal characteristics of the transformer to define the transformer for fabrication in the integrated circuit by performing the steps of:
combining the one or more desired characteristics with other preset characteristics of the transformer or the integrated circuit,
defining a first model of the transformer with typical load impedances,
simulating the first model having the combined characteristics to determine performance,
processing results of the simulation to calculate performance with the load impedances specified by the user,
processing the results to obtain a mathematical model that includes tuning capacitors by solving a constrained optimization problem to determine optimal values of the tuning capacitors based on the one or more desired characteristics and one or more optimization targets, whereby, given a transformer described by:
a set of S-parameter matrices S,
sampled at a set of frequencies F={f(1), ... f(M)}, and given an operating frequency f(i), with I in {1, ... M},
a pair of primary/secondary loads Zp, Zs, which may be defined either as fixed complex numbers or as RL/RC series/parallel circuits,
a pair of tuning capacitors c1, c2 are calculated such that insertion loss S12'(i) of the tuned circuit is maximal, subject to the following constraints:
the capacitor values are restricted by
c1 in [$c1_{min}$, $c1_{max}$], and
c2 in [$c2_{min}$, $c2_{max}$]
return losses are restricted by
S11'<=$RL_{\_max}$, and
S22'<=$RL_{\_max}$
Bandwidth [f(i)–f_BW1, f(i)+f_BW2] of s12' is restricted by
F_BW1>=$BW_{\_min}$, and
F_BW2<=$BW_{\_max}$
inferring a modification of the first model based on general dependency of at least one design criterion, selected from at least a physical, geometrical or performance characteristic, with another design criterion, and
iteratively determining a design solution for the transformer through one or more simulations and inferred modifications.

2. The apparatus of claim 1, wherein the user interface is adapted to allow a user to input one or more optimization targets.

3. The apparatus of claim 2, wherein the one or more optimization targets include lowest possible insertion loss.

4. The apparatus of claim 1, wherein the transformer includes a plurality of taps connecting the primary coil to either a fixed potential, a signal, or a load.

5. The apparatus of claim 1, wherein the transformer includes a plurality of taps connecting the secondary coil to either a fixed potential, a signal, or a load.

6. A method for designing a transformer in an integrated circuit, the method comprising:
receiving one or more desired characteristics of the transformer from a user input device;
combining the one or more desired characteristics with other preset characteristics of the transformer or the integrated circuit;
using a model extraction engine to define a first model of the transformer with typical load impedances;
using a simulator to simulate the first model having the combined characteristics to determine performance;
processing results of the simulation of the first model to calculate performance with the load impedances specified by the user;
processing the results to obtain a mathematical model that includes tuning capacitors by solving a constrained optimization problem to determine optimal values of the tuning capacitors based on the one or more desired characteristics and one or more optimization targets, whereby, given a transformer described by:
a set of S-parameter matrices S,
sampled at a set of frequencies $F=\{f(1), \ldots f(M)\}$,
and given an operating frequency $f(i)$, with I in $\{1, \ldots M\}$,
a pair of primary/secondary loads Zp, Zs, which may be defined either as fixed complex numbers or as RL/RC series/parallel circuits,
a pair of tuning capacitors c1, c2 are calculated such that insertion loss $S12'(i)$ of the tuned circuit is maximal, subject to the following constraints:
the capacitor values are restricted by
c1 in $[c1_{min}, c1_{max}]$, and
c2 in $[c2_{min}, c2_{max}]$
return losses are restricted by
$S11' <= RL\_{max}$, and
$S22' <= RL\_{max}$
Bandwidth $[f(i)-f\_BW1, f(i)+f\_BW2]$ of s12' is restricted by
$F\_BW1 >= BW\_{min}$, and
$F\_BW2 <= BW\_{max}$;
using an inference engine to infer a modification of the first model based on a general dependency of at least one design criterion, selected from a physical, geometrical or performance characteristic, with another design criterion; and
iteratively determining a design solution for the transformer through one or more simulations and inferred modifications.

7. The method of claim 6, further comprising:
receiving the one or more optimization targets from user input.

8. The method of claim 7, wherein the one or more optimization targets include lowest possible insertion loss.

9. The method of claim 6, wherein the transformer includes a plurality of taps connecting the primary coil to either a fixed potential, a signal, or a load.

10. The method of claim 6, wherein the transformer includes a plurality of taps connecting the secondary coil to either a fixed potential, a signal, or a load.

11. A non-transitory machine readable medium having instructions thereon that when executed cause an apparatus to:
receive one or more desired characteristics of a transformer from user input;
combine the one or more desired characteristics with other preset characteristics of the transformer or an integrated circuit of which the transformer is a component;
define a first model of the transformer with typical load impedances;
simulate the first model having the combined characteristics to determine performance;
process results of the simulation to calculate performance with the load impedances specified by the user by solving a constrained optimization problem to determine optimal values of the tuning capacitors based on the one or more desired characteristics and one or more optimization targets, whereby, given a transformer described by:
a set of S-parameter matrices S,
sampled at a set of frequencies $F=\{f(1), \ldots f(M)\}$,
and given an operating frequency $f(i)$, with I in $\{1, \ldots M\}$,
a pair of primary/secondary loads Zp, Zs, which may be defined either as fixed complex numbers or as RL/RC series/parallel circuits,
a pair of tuning capacitors c1, c2 are calculated such that insertion loss $S12'(i)$ of the tuned circuit is maximal, subject to the following constraints:
the capacitor values are restricted by
c1 in $[c1_{min}, c1_{max}]$, and
c2 in $[c2_{min}, c2_{max}]$
return losses are restricted by
$S11' <= RL\_{max}$, and
$S22' <= RL\_{max}$
Bandwidth $[f(i)-f\_BW1, f(i)+f\_BW2]$ of s12' is restricted by
$F\_BW1 >= BW\_{min}$, and
$F\_BW2 <= BW\_{max}$;
process the results to obtain a mathematical model that includes tuning capacitors;
infer a modification of the first model based on general dependency of at least one design criterion, selected form a physical, geometrical or performance characteristic, with another design criterion; and
iteratively determine a design solution for the transformer through one or more simulations and inferred modifications.

12. The non-transitory machine readable medium of claim 11, further comprising instructions thereon that when executed cause an apparatus to:
receive one or more optimization targets from user input.

13. The method of claim 12, wherein the one or more optimization targets include lowest possible insertion loss.

14. The non-transitory machine readable medium of claim 12, wherein the transformer includes a plurality of taps connecting the primary coil to either a fixed potential, a signal, or a load.

15. The non-transitory machine readable medium of claim 12, wherein the transformer includes a plurality of taps connecting the secondary coil to either a fixed potential, a signal, or a load.

* * * * *